June 26, 1962 L. W. DHANES 3,041,011
METHOD AND APPARATUS FOR VERNIER MAP MATCHING
AND FLIGHT CONTROL THEREWITH
Filed March 12, 1951 2 Sheets-Sheet 1

LESTER W. DHANES,
INVENTOR.

BY *Gerald H. Peterson*

ATTORNEY.

LESTER W. DHANES,
INVENTOR.

BY
ATTORNEY.

3,041,011
METHOD AND APPARATUS FOR VERNIER MAP MATCHING AND FLIGHT CONTROL THEREWITH

Lester W. Dhanes, Santa Monica, Calif., assignor to The Rand Corporation, Santa Monica, Calif.
Filed Mar. 12, 1951, Ser. No. 218,502
25 Claims. (Cl. 244—14)

This invention relates to a method and apparatus for controlling the position and movement of a body such as a missile by the comparison of an image of a scene viewed from such body with a previously taken negative of the same scene. More particularly it relates to such a method and apparatus employing map matching for guiding the path of movement of such a moving body as a missile.

It is known to guide a missile over a terrain, for example, by an arrangement which optically compares a positive image of the terrain over which the missile is traveling with a previously taken negative of the same scene and in accordance with which arrangement the controlling devices of the missile automatically maintain the missile in that path of flight corresponding to a minimum of light from the positive image passing through the negative onto viewing photoelectric cells which operate the controls of the missile. This comparison of such a positive image of identical size as the negative image is known as "map matching."

My invention relates to an improvement in map matching, in which an important feature of novelty is that I compare a positive image with a negative image which is either sufficiently larger or smaller than the positive image that, when the two are centrally aligned, a substantially round black or dark spot will appear in the central portion of the compared images and, when the positive image moves out of such alignment, the dark spot moves outward from the central position. The reasons for the appearance and movement of the spot will appear from the description to follow.

In accordance with my invention, I control the flight of such a moving body as a missile by maintaining this dark spot in the central portion of the compared images, as more particularly described below.

In accordance with one specific embodiment of my invention, I may direct a missile downward onto a target by providing in the missile a negative transparency of the scene below including the object at which the missile is directed and focusing a positive image of the same scene on the negative. This positive image will be somewhat larger, for example, about 5% larger, than the negative image of the same scene. The compared images, that is, the resulting light transmitted through the area of compared images, is divided into four equal quadrants, and each of the four quadrants is viewed by one of four photoelectric cells. Each pair of photoelectric cells viewing quadrants opposite the center is operatively connected to one of the two fins or guiding means of the missile so that the missile is guided to maintain a light balance between the two quadrants of each pair. For example, assuming the quadrants of a square image to be orientated so that the outside corners of the four quadrants point north, east, south and west, respectively, so that one pair will consist of the north and south quadrants and the other pair of the east and west quadrants. The two photocells viewing the north and south quadrants respectively will be operatively connected to a fin the surface of which extends east and west but which is adapted to control the north and south direction of flight, so that in downward flight a light balance is maintained between the north and south quadrants. This is accomplished by so moving the fin when one quadrant gets darker than the other to cause the missile to move north or south so that the spot moves back into the central position with the north and south quadrants again in light balance. In the same way, the two photoelectric cells viewing the east and west quadrants are operatively connected to a second fin at right angles to the first fin to so control the missile in flight to maintain the light of the east and west quadrants in balance. It will be understood, of course, that the missile must first be directed toward the target with an accuracy within the limits of my device and the compass directions on the negative must be aligned with the actual compass directions of the positive image; that is, the positive image and the negative must be directionally adjusted and the two images must be substantially centrally aligned. As will be understood by those skilled in the art to which my invention relates, this is customary in map matching, and the usual methods and devices may be used for this purpose.

It is an especially significant feature of my invention that not only is it sensitive to alignment of the two images, and such sensitivity may be made to have any desired value within a wide range by adjusting the relative scale of positive and negative images, but also, with the two photocells viewing two opposite quadrants, my invention is sensitive to direction along the line of the two quadrants. For example, if the missile veers off course toward north, the spot will move into the north quadrant and light balancing adjustment of the north and south quadrants will again direct the missile southward to correct its flight direction toward the target.

For the situation when the missile changes altitude, as by descending, a lens system for maintaining the positive image a constant size is preferably provided as part of my invention so that a constant relative size of positive and negative images will be maintained. It will be understood, of course, that for traveling over a terrain at constant altitude, or where the positive image remains the same relative size as the negative, this feature will not be needed. Also, for relatively small changes in distance from the object resulting in only a relatively small change in relative size of the image, it will be understood that my invention may be used without such a means for maintaining the two images of constant relative size, because as the size of the positive image changes with change in distance from the object, even though the relative size of positive and negative images changes, such change when not too large will cause only a change in sensitivity of my invention. For example, with the positive image 5% larger than the negative image at the start of descent of the missile, the positive image will become larger with approach to the object and the spot will gradually become smaller. As the spot becomes smaller, some sensitivity may be lost, but if this change is not too large, the device of my invention will still operate satisfactorily. In accordance with one specific embodiment of this aspect of my invention in which means is provided for maintaining a constant relative size between the two images, an arrangement is provided which automatically maintains the positive image a constant size. This is accomplished by a relatively large photoelectric cell which simultaneously views all four quadrants. This photoelectric cell is in turn operatively connected to a means such as a motor which adjusts a telescopic lens system such as a variable powered telescope to maintain the positive image a constant size and to maintain the light falling on this photoelectric cell a constant value. To maintain the light on this large photoelectric cell a constant value the positive image must be maintained the same relative size with respect to the fixed size of the negative, and hence, a constant size. In the case where the positive image is slightly larger than the negative, if it gets still larger the black spot viewed by the large photoelectric cell will become smaller and the amount of light falling on this photoelectric cell will become larger. This will in turn cause the motor to adjust the lens system to decrease the size of the positive image back to the constant value. If the positive image becomes smaller than the desired size, the black spot will become larger and the amount of light falling on the large photoelectric cell will decrease, which in turn will cause an adjustment of the lens system to increase the size of the positive image. Thus, it will be seen that this arrangement will automatically maintain any fixed size of positive image in accordance with any desired setting of the large photoelectric cell.

My invention will be further explained by reference to a specific embodiment thereof shown in the accompanying drawing in which.

Figure 1:
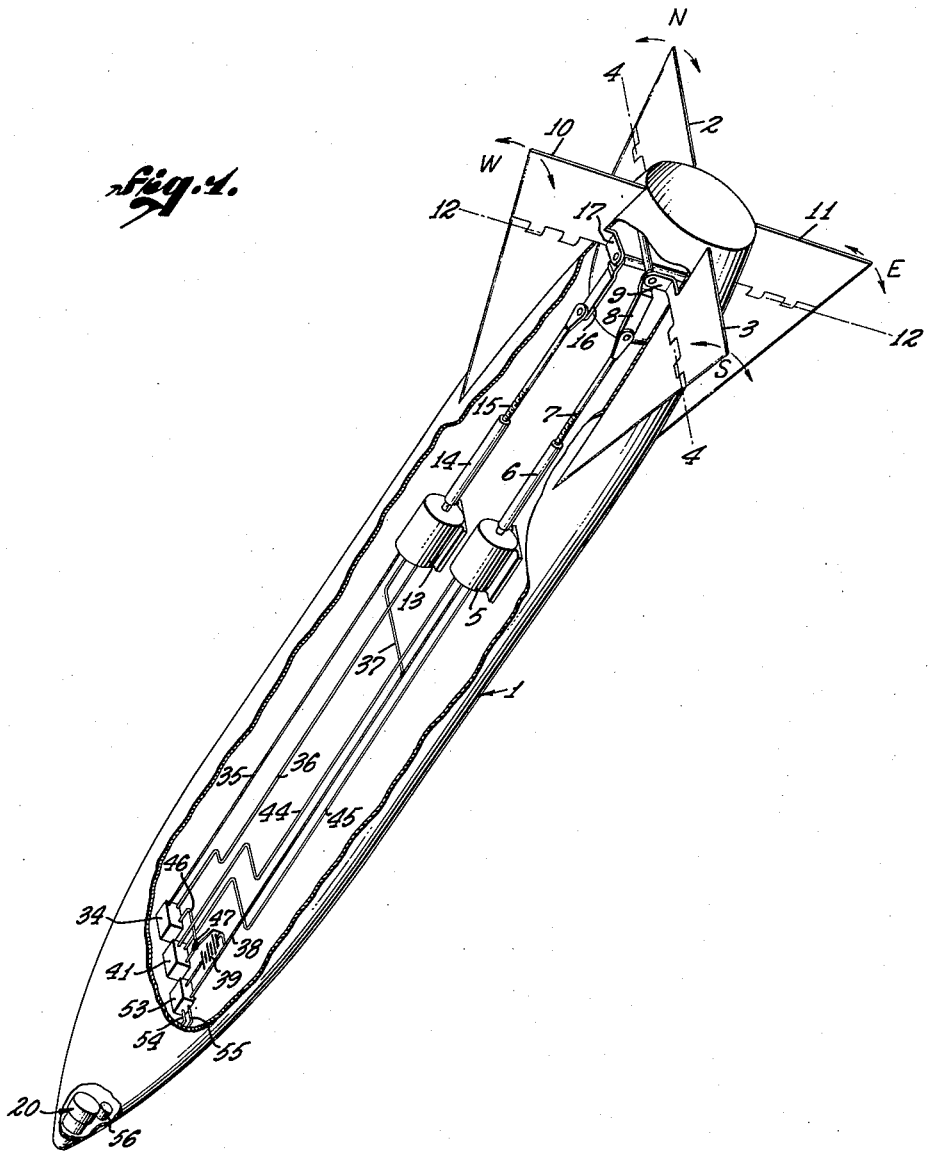
FIGURE 1 shows a missile with guiding means in accordance with my invention.

Referring particularly to FIGURE 1 at 1 is shown generally a missile which for convenience may be regarded as heading straight downward having adjustable fins 2 and 3 which for convenience in explaining may be regarded as extending generally north and south and which upon movement about axis 4—4 direct the missile eastward or westward as will be understood by those skilled in the art to which my invention relates. Fins 2 and 3 are operatively connected as a unit and are moved by means of motor 5 which turns shaft 6 which is hollow having threads which mesh with connecting threaded member 7 which is pivotally connected to link 8 which in turn is pivotally connected to member 9 fixed to fin 3. As motor 5 turns in one direction or the other shaft 6 and threaded member 7 work to move member 7 backward or forward which, as will be understood by those skilled in the art, through link 8 and member 9 causes fins 3 and 2 to rotate one direction or the other about axis 4—4. This directs the missile with respect to the east-west direction. The other fins 10 and 11 extending generally in an east-west direction are adapted to be rotated about axis 12—12 by means of motor 13 shaft 14 threaded member 15 pivoted link 16 and fixed member 17 in the same manner as described above for fins 2 and 3.

Figure 2:
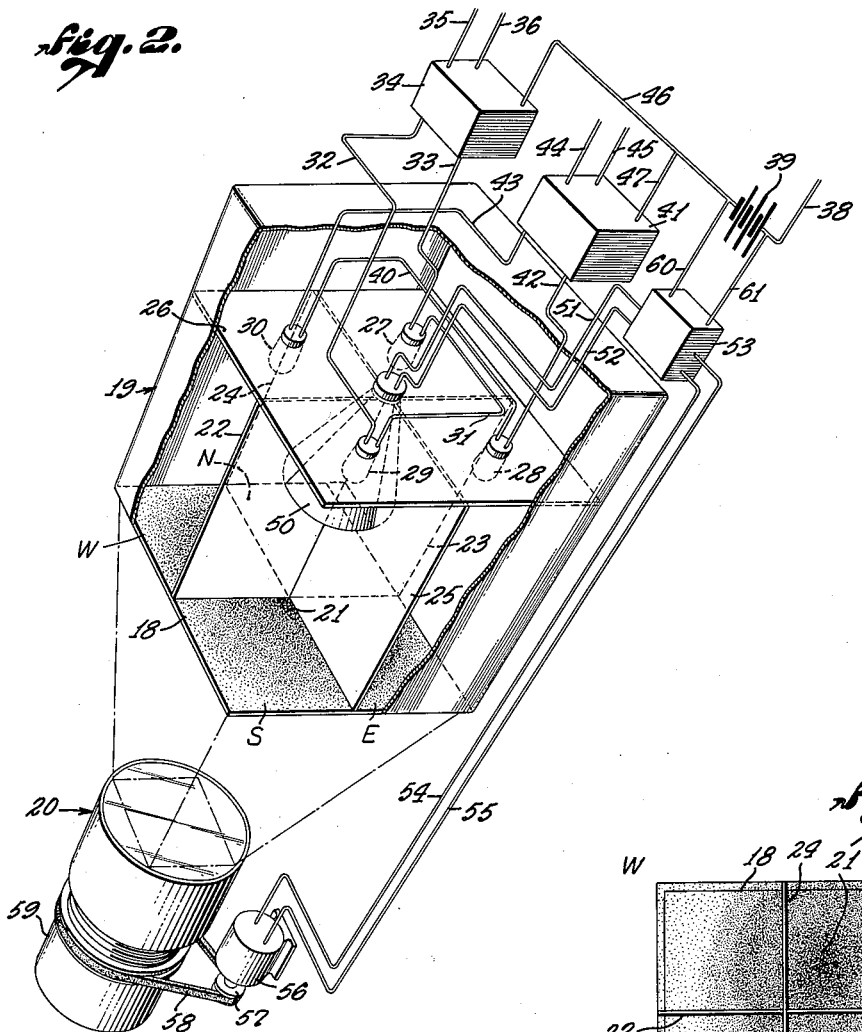
FIGURE 2 shows in detail the arrangement for making a comparison of the positive image and negative with means for translating the comparison into electrical impulses which may be used for operating the control fins of a missile, and including means for automatically maintaining the positive image a constant size.

The electrical impulses which operate motors 5 and 13, respectively, to control fins 2 and 3 and fins 10 and 11, respectively, are derived from the device shown in detail in FIGURE 2. At 18 is shown a negative transparency of the scene which centrally includes the target at which the missile is directed. The transparency 18 is held at the bottom of a casing 19 which is open at the bottom so that light may fall upon and pass through the transparency from below from lens system 20. Lens system 20 is optically designed to focus the same scene on the transparency 18 with the target centrally located and coinciding with the target on the transparency and with the size of the positive image from the lens system slightly larger, for example, about 5 percent larger, than the image of the same scene on the transparency. As pointed out above, the compass directions of the transparency will be lined up with the compass directions of the positive image in accordance with known procedure. With such a positive image thus directionally adjusted and centrally aligned with the negative transparency, a dark spot 21 will appear in the central portion of the combined field of negative and positive images.

In general, the reason for the "dark spot" phenomenon is that within, and only within, the area of the spot, the superimposed positive and negative images are substantially exactly complementary. In other words, for every bright point in one of the two images, there is a corresponding and superimposed dark point in the other image whereby no light can pass through the superimposed images within the area of the spot.

For a more detailed description and explanation of the above-mentioned phenomenon, one should first consider only the "positive-negative" relationship between the images. Taking a given bright point in the projected image, it will be seen that the corresponding overlying point in the matching negative transparency image will be opaque and thus no light will pass through at such point. Conversely, at some other point in the composite image, the transparency may be clear but the corresponding point in the projected image, being the photographic reverse thereof, will be dark and hence no light will pass through at the second point either.

Thus, it will be realized that if two images, positive and negative, and identical in all respects including scale, are exactly superimposed, no light will pass through the composite at any point. Furthermore, it will be seen that if two such equal scale images are slightly mis-matched, that is, one is shifted slightly with respect to the other, some light will on the average pass through the two in all areas thereof having appreciable size since, by the law of probabilities, not every bright point in the projected image will be overlain by an opaque point in the transparency. In other words, some bright points in the projected image will match clear points in the transparency and at those points, light will pass through the transparency.

Put another way, the effect of mis-matching images of the same scale is on the average to admit light through every finite incremental area of appreciable size within the total comparison area. The total amount of light passed under the just-described condition will depend upon the degree of mis-match being relatively greater with greater shift of one image with respect to the other.

Considering now the present arrangement wherein the two images differ somewhat in sacle, it will be seen that when the two images are properly oriented compass-wise, with respect to each other, they cannot be exactly matched simultaneously at all points in the comparison area. By the same token, however, within the limits of the difference in scale, some point in the comparison area will exactly match irrespective of the amount (within the aforesaid limits) or direction of shift of the two images. At this exact matching point, no light will pass through the superimposed images. This exact match will occur at only one point however, and all other points will be mis-matched to some degree. The degree of mis-match will be progressively greater with distance from the exact match point. Thus, the light passing through the transparency will be greater and greater with distance from the point of match.

If the degree of scale difference is not large, say on the order of five percent, all points within a discernable area relatively close to the point of exact match will substantially match and very little light will pass through the transparency in this defined area or spot surrounding the point of exact match. The size of the dark spot will of course vary in accordance with the aforesaid scale difference, the spot being relatively small with a large difference in scale and relatively large with a small difference in scale.

It will be seen from the foregoing explanation that the complemental relationship between the positive projected image and the negative transparency creates the dark spot within an area where the two images are substantially the same size. A random pattern of light and dark areas such as comprises the usual aerial scene is, by the use of this invention, overlain by a pattern of opaque and clear areas in which the shape and arrangement is identical as in the original scene but in which each incremental area is photographically reversed so that at every point in the composite image within the spot area, one or the other of the two compared images is dark, thus preventing passage of any substantial amount of light through any point within the spot area. Thus, it makes no difference whether the projected image is positive or negative, or whether the match point (target) is light or dark so long as the transparency used therewith is photographically reversed with respect thereto.

Obviously, as one image is shifted with respect to the other, the point at which they exactly match shifts; therefore, the dark spot shifts also and in the same direction.

Figure 3:
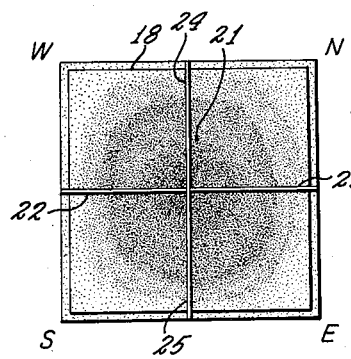
FIGURE 3 illustrates schematically the combined optical effect of positive image and negative with a black spot generally in the central portion.

The spot effect used as a control is illustrated schematically in FIGURE 3 which shows spot 21 centrally located with respect to quadrants N, E, S, and W. This combined field is divided up into quadrants designated as N, E, S and W by partitions 22, 23, 24 and 25 extending perpendicular to the plane of the image and perpendicular to one another. At the top of these partitions is a cover member 26 which extends above and coextensive with the quadrants N, E, S and W. Depending from the cover 26 are four photoelectric cells 27, 28, 29 and 30 which receive light from each of the respective quadrants N, E, S and W.

The pair of photoelectric cells 27 and 29 which view quadrants N and S respectively are electrically connected in series by line 31 and lines 32 and 33 to electrical relay box 34. From electrical relay box 34 are two leads 35 and 36 (shown both in FIGURES 1 and 2) which lead to motor 13. Ground return from motor 13 is shown at 37 which connects with line 38 back to battery 39. Current from battery 39 is supplied to relay boxes 34 and 41 by lines 46 and 47.

Figure 4:
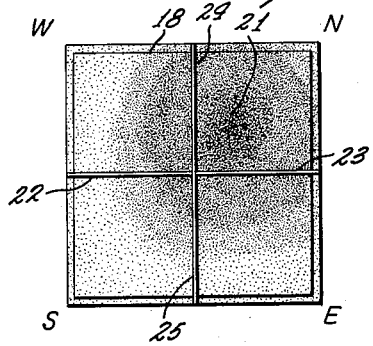
FIGURE 4 is the same as FIGURE 3 with the black spot off the central position.

As will be understood by those skilled in the art photocell 27 and 29 are so connected that when the light intensity upon each is equal the electromotive force from each balances and no current flows to the relay box 34. However, when the light on photocell 29 from quadrant S is greater than the light on photocell 27 from quadrant N, as will occur, for example, when the missile veers toward north so that dark spot 21 will move into the end quadrant, as illustrated in FIGURE 4, a current will be sent to the relay box through line 33 and 32 and the relay will cause an electrical impulse to travel through line 35 which will cause motor 13 to turn in such a manner to move fins 10 and 11 to cause the missile 1 to travel toward south and away from north until the light on photocells 27 and 29 from quadrant N and S respectively is again in balance. To do this it will be understood of course that the motor 13 will through elements 14, 15, 16 and 17 cause the tail end of fins 10 and 11 to move in a southerly direction. Likewise, if the light on photocell 29 from quadrant S is lower in intensity than the light on photocell 27 from quadrant N a current in the opposite direction from the photocells will pass through lines 32 and 33 and operate relay 34 to send an electrical impulse through line 36 to cause motor 13 to turn in the opposite direction and in turn move the tail end fins 10 and 11 in a northerly direction to cause the missile 1 to move from south to north, again until the light on photocells 27 and 29 from quadrants N and S respectively is again in balance.

In the same way photocells 28 and 30 are connected together through line 40 and to electrical relay box 41 through lines 42 and 43, and relay box 41 through lines 44 and 45 sends electrical impulses to motor 5 to cause it to turn in one direction or the other and thus cause the tail end of fins 2 and 3 to move eastward or westward in the same manner as relay 34 operating through lines 35 and 36 on motor 13. Accordingly, it will thus be seen how with this system it is possible to maintain the dark spot 21 centrally located with respect to quadrants N and S and W and E and in so doing direct the missile to the target in the center of the dark spot 21.

In order to maintain the positive image from lens system 20 the same size relative to the transparency as the missile changes altitude, as by descending and getting closer to the scene to be focused on transparency 18, means are provided to automatically adjust lens system 20. Large photocell 50 also depends from cover 26 and extends downwardly into partition 22, 23, 24 and 25 in such a manner as to be divided into four equal quadrants each of which receives light from quadrants N, E, S and W simultaneously. The electrical output from photocell 50 passes through lines 51 and 52 to electrical box 53 which operates a relay to cause current to travel in lines 54 and 55 to cause motor 56 to turn in one direction when the light intensity and hence current in lines 51 and 52 falls below a set value and to cause motor 56 to turn in the opposite when the light density and hence the current in lines 51 and 52 falls above a set value. Motor 56 through pulley 57 and belt 58 turns rotatable portion 59 of lens system 20 to adjust the size of the image constantly focused on transparency 18. Current for electrical box 53 is supplied from the battery 39 by lines 60 and 61. With this arrangement, as the missile descends and the image on transparency increases in size, the dark spot 21 becomes smaller in size so that the total light falling on photocell 50 increases, the current in lines 51 and 52 increases above the set value in box 53, the relay in box 53 operates to send a current in lines 54 and 55 to cause motor 56 to turn adjustable element 59 with lens system 20 to decrease the size of the positive image on transparency 18 to the original size, that is, to cause spot 21 to come back to its original size. Should this overadjust, or should the missile gain altitude, and cause the positive image to focus on negative 18 to become smaller than the original size so that spot 21 becomes larger than its original size, the total light falling on photocell 50 would decrease and the current in lines 51 and 52 would decrease below the value set in electrical box 53 so that current would flow in lines 54 and 55 in the opposite direction causing motor 56 to turn in the opposite direction and in turn cause adjustable element 59 to turn in the opposite direction and increase the size of the positive focused on transparency 18 until spot 21 returns to its original size.

Although the description above has been made assuming the missile to be directed straight downwardly, it will be understood, of course, that my invention may be used for guiding a missile or other moving body over a terrain, in which case a moving transparency strip will be substituted for the fixed transparency 18 and this moving strip will be synchronized with the flight of the missile over the terrain so that the image on the negative corresponds with the scene below, as is customary with map-matching. For this purpose, the line of flight of the missile will preferably bisect the angle between the partitions of one pair of quadrants so that the effective control or guiding of the missile will be done by means of the other pair of quadrants and associated photocells and controls. For example, assuming the missile to be traveling due north the device of my invention will be so oriented in the missile that the line bisecting the N and S quadrants will be the line of flight of the missile. Under these conditions the guiding of the missile will be done by the E and W quadrants and associated photoelectric cells with their controlling means to fins 10 and 11. With this arrangement it will be understood that the device of my invention as particularly shown in FIGURE 2 will be pointing downwardly. Assuming the missile to be traversing at a substantially constant altitude above the terrain, it will be understood that lens system 20 may be a fixed lens system, but for convenience for use at different altitudes my adjustable lens system 20 as shown is preferred.

As a modification of my invention a P.P.I. radar may be used for producing an image on a corresponding photographic negative radar image in place of the negative 18 so that, in the manner as described above a comparison is made of radar images instead of optical images. When radar is used the size of the positive image on the scope which is placed adjacent the negative will be maintained constant not, of course, by a lens system such as 20 but by using the voltage from photocell 50 to control the size adjusting voltage of the P.P.I. scope.

I claim:

1. In the method of controlling the path of movement of a moving object in which such control is effected in accordance with light transmission resulting from a comparison of an image of the scene viewed from the moving object with a previously obtained image of the same scene the improvement which comprises effecting said comparison between images having a relatively small difference in scale in at least one direction sufficient to cause a zone of relatively low light transmission in the central portion of the compared images and outwardly adjacent zones of progressively increasing light transmission when said images are centrally and directionally aligned.

2. In the method of controlling the path of movement of a moving object in which such control is effected in accordance with light transmission resulting from a comparison of an image of the scene viewed from the moving object with a previously obtained image of the same scene the improvement which comprises effecting said comparison between images having a relatively small difference in scale sufficient to cause a zone of relatively low light transmission in the central portion of the compared images and surrounding zones of progressively increasing light transmission when said images are centrally and directionally aligned.

3. The method of controlling direction of flight of a moving object which comprises comparing a positive image of a scene viewed from the moving object and fixed with respect to said object with a negative image of the same scene centrally and directionally aligned in substantially the same plane as said positive image and having a relatively small difference in scale with respect to said positive image such that when said images are directionally and centrally aligned and said moving object is directed toward the center of said negative image a dark spot of relatively low light transmission through said negative appears in the central portion of said compared images, said dark spot is surrounded by zones of progressively decreasing density, and said dark spot moves in the area of said compared images in the direction that said moving object veers off its desired course from the center of said negative image, and controlling direction of movement of said moving object in accordance with the relative light transmission through areas of said compared images located across the central portion of said images in a direction corresponding to the direction of movement to be controlled.

4. The method as defined in claim 3 in which said positive image is maintained a substantially constant size with changes in distance between said moving object and said scene.

5. A device for controlling direction of flight of a moving object which comprises a negative image of a scene viewable from said moving object, means for producing, centrally and directionally aligning, and comparing a positive image of said scene viewed from said moving object with said negative image, said positive image having a scale sufficiently different from said negative image that a dark spot corresponding to a zone of low light transmission will appear in the central portion of said compared images which moves in the area of said compared images in the direction that said moving object veers off its desired course toward the center of said negative image, and means for controlling direction of movement of said moving object in accordance with the relative light transmission through areas of said compared images located across the central portion of said images in a direction corresponding to the direction of movement to be controlled.

6. A device as defined in claim 5, having means for maintaining said positive image, a substantially constant size with changes in distance between said moving object and said scene.

7. A device for controlling direction of flight of a missile which comprises a negative image of a scene viewable from said missile, means for producing, centrally and directionally aligning, and comparing a positive image of said scene viewed from said missile with said negative image, said positive image having a scale sufficiently different from said negative image that a dark spot corresponding to a zone of low light transmission will appear in the central portion of said compared images which moves in the area of said compared images in the direction that said missile veers off its desired course from the center of said negative image, means separating the area of said compared images into substantially equal quadrants arranged about the center of said area, each of a first pair of photocells viewing each of a pair of said quadrants across said center, each of a second pair of photocells viewing each of the other pair of said quadrants, a first means for controlling the flight direction of said missile along the direction of one of said pair of quadrants, a second means for controlling the flight direction of said missile along the direction of said other pair of quadrants, means for controlling said first means in accordance with the relative light intensity falling on said first pair of photocells, and means for controlling said second means in accordance with the light intensity falling on said second pair of photocells.

8. In a device as defined in claim 7, having means for maintaining the size of said positive image constant with changes in distance of said missile from said scene.

9. In a device as defined in claim 8 in which said means comprises a photocell viewing all four of said quadrants simultaneously and means for adjusting the size of said positive image in accordance with the light falling on said photocell.

10. In a device as defined in claim 8 in which said means comprises a photocell viewing all four of said quadrants simultaneously and a variable powered telescope for adjusting said positive image, and means for adjusting said variable powered telescope in accordance with the light intensity falling on said photocell.

11. In a device for scene matching in which a positive image of a scene is superimposed upon and compared with a photographic negative of the same scene, the improvement which comprises the combination of a photographic negative of a scene and means for superimposing and centrally aligning a positive image of the same scene of somewhat different size from the size of the negative image, said difference being small and sufficient to create a relatively dark area in the middle of the compared images.

12. In a device for scene matching in which a positive image of a scene is superimposed upon and compared with a photographic negative of the same scene, the improvement which comprises the combination of a photographic negative of a scene and means for superimposing and centrally aligning a positive image of the same scene of somewhat different size in at least one direction of said scene from the size of the negative image, said difference being small and sufficient to create a relatively dark area in the middle of the compared images.

13. In a device for directing a moving vehicle toward an object, of the type which comprises optical means for producing an indication of the direction in which said vehicle veers off its course toward said object, and means controlling the path of movement of said vehicle in accordance with said indication, the improvement in which said optical means comprises a photographic negative of a scene including said object as viewed from said vehicle and means for producing upon said negative a positive image of the same scene at a somewhat different scale, centrally and directionally aligned with respect to said object.

14. In a device as defined in claim 13 in which said positive image is optically produced by means of a lens system.

15. In a device as defined in claim 13 in which said positive image is produced by radar upon a radar scope.

16. The combination comprising a photographic negative image of a scene having superimposed thereon a positive image of the same scene of slightly different scale.

17. The combination as defined in claim 16 in which said positive image is about 5 percent larger in scale than said negative image.

18. The method of matching two images of a given scene having light and dark objects distributed at random therein, which comprises: producing said images at slightly different scales and photographically reversed with respect to each other; superimposing said images in directional alignment whereby to produce within the area of said superimposed images, a relatively small spot of maximum composite density at the point where said images are in optimum register; and moving said images with respect to each other to place said spot at a given point in one of said images.

19. The method set forth in claim 18, further characterized in that the relative moving of said images is performed by producing one of said images by projection along an optical axis fixed with respect to a vehicle moving with respect to said scene and steering said vehicle.

20. The method set forth in claim 19, further characterized in that said steering is performed in accordance with the direction and amount of displacement of said spot from said last-named point.

21. The method set forth in claim 20, further characterized by continuously varying the scale of said projection in accordance with the variation in distance between said vehicle and scene whereby to maintain a substantially constant ratio of the respective scales of said superimposed images.

22. The method of fixing the position of a recorded image of a scene having light and dark objects distributed at random therein, with respect to said scene itself, which comprises: superimposing a projected image of said scene on said recorded image in directional alignment therewith, at a slightly different scale, and photographically reversed with respect thereto, whereby corresponding parts in said recorded and projected images combine to produce within the area of said superimposed images, a relatively small dark spot at the point where said images are in optimum register; and moving said images relatively in accordance with the position of said spot in one of them.

23. Homing apparatus for a moving vehicle comprising: a recorded image of a scene with respect to which said vehicle is to be directed; means for superimposing on said recorded image and in directional alignment therewith, a second image of said scene as seen from said vehicle, said second scene being at a slightly different scale and photographically reversed with respect to said recorded image and said second image having a point in register with a corresponding point in said recorded image, whereby the average composite density of said superimposed images in any incremental zone thereof, varies inversely as the distance of said zone from said point; and means to direct said vehicle in accordance with the relative composite densities in various zones of said superimposed image area.

24. The apparatus of claim 23, further characterized by having means for varying the scale of said second image in accordance with the variation in distance between said vehicle and scene whereby to maintain a substantially constant ratio of the respective scales of said superimposed images.

25. In a device for controlling direction of flight of a moving object in which such control is effected in accordance with the light transmission resulting from a comparison of a current image of a scene viewed from the moving object with a previously obtained image of the same scene, the improvement which comprises: means to support said previously obtained image in a comparison area; and projector means for producing on said comparison area, said current image of the scene viewed from the moving object said current image being photographically reversed from said previously obtained image, and at a scale having relatively small difference with respect to the scale of said previously obtained image, said scale difference being sufficient to cause a zone of relatively low light transmission appearing as a dark spot in the central portion of the compared images and surrounding zones of progressively increasing light transmission when said images are centrally and directionally aligned in said comparison area.

References Cited in the file of this patent

UNITED STATES PATENTS

| 1,016,240 | Alexieff | Jan. 30, 1912 |
| 1,747,664 | Droitcour | Feb. 18, 1930 |
| 2,063,765 | Smola | Dec. 8, 1936 |
| 2,074,251 | Braun | Mar. 16, 1937 |
| 2,406,451 | Borkenstein | Aug. 27, 1946 |
| 2,421,012 | Chew | May 27, 1947 |
| 2,424,193 | Rost et al. | July 15, 1947 |
| 2,508,562 | Bonner | May 23, 1950 |
| 2,526,682 | Mulberger | Oct. 24, 1950 |

FOREIGN PATENTS

| 352,035 | Great Britain | June 22, 1931 |